Patented Nov. 1, 1932

1,886,232

UNITED STATES PATENT OFFICE

ROLF KARL OSKAR SAHLBERG, OF NEW YORK, N. Y., ASSIGNOR TO THE AEROCRETE CORPORATION OF AMERICA, OF NEW YORK, N. Y., A CORPORATION OF DELAWARE

CELLULAR CONCRETE

No Drawing.     Application filed June 29, 1929.   Serial No. 374,960.

This invention relates to cellular concrete and has for its object the provision of an improved cellular concrete. More particularly, the invention aims to provide a cellular concrete which has greater tensile and compressive strength than cellular concrete heretofore made.

In the hitherto customary method of making cellular concrete various methods have been proposed for obtaining the cellular structure. Three methods are chiefly used; the chemical, mechanical or electrolytic. In accordance with these methods, the chemical method depends upon the production of gas within the mixed concrete from a chemical action taking place within the mass. In the mechanical method cellular aggregates may be added to the concrete mass, or air or some similar gaseous fluid forced into the setting concrete. The electrolytic method depends upon an electrolytic action for the production of gas within the concrete while it is setting. The invention of the present application is applicable with comparable benefits in all of the methods heretofore customarily used for the production of cellular concrete.

I have found that by properly proportioning the size of the individual particles of inert ingredients used in the mixture that cellular concrete may be produced in which the strength curves vary directly with the weight per cubic foot of the finished cellular concrete. I have found also with the proper grading of inert materials that a marked improvement may be made in the texture and general physical properties including water resisting qualities.

Throughout the specification and the appended claims I make use of the term pulverized sand or silica. This term is intended, however, to include other materials. In most concrete mixes the silica sand lends itself to fine grinding or pulverizing more advantageously than the larger aggregates comprising the mix. However, as local conditions dictate, the finely ground material may comprise any of the ingredients of the mix or some naturally occurring subdivided material. Stone dust, granite, brown mortar sand, flue dust, bauxite or the like may be used as the finely subdivided material. These materials may be a by-product of some other process or a naturally occurring product with the requisite small particle size. I do not intend to confine the specification or appended claims to pulverized sand or silica.

I have found that by utilizing as part of the inert materials of the mix a substance which is of substantially the same fineness as Portland cement or, in other words, that substantially all passes through a 200 mesh screen, an improved cellular concrete is obtained. The use of this material for at least a part of the sand used in the cellular concrete results during the mixing in a more plastic mass than is customarily obtained. The gas action is more uniform, thus producing a more even texture in the finished product. Further I have found, when a given proportion of pulverized silica or finely divided material is used, that there is no tendency in cellular concrete mixtures for the water to segregate from the aggregates and no tendency for the exposed surface to break down when the point of maximum expansion has been reached. A more advantageous strength curve is obtained thus proving that the pulverized aggregate acts favorably on the hydration of the cement.

The use of silica ground so that it all passes through a 200 mesh screen produces a cellular concrete which is much less subject to contraction cracks than is the customary cellular concrete. This diminution or eradication of contraction cracks is especially noticeable when the lighter weight grades of cellular concrete are being made.

In the practice of the invention I have found it advantageous when making a cellular concrete to make the concrete in about the following proportions: 1 part Portland cement, 1 part pulverized silica sand and 2 parts commercial mortar sand; to this is added the cellular producing compound. I do not intend to confine myself to the above proportions entirely. They are given as an indication of that which I have found to be advantageous and the preferred proportions known to me at the present time for use with the particular cellular producing compound which I prefer to use namely, aluminum powder and lime together with water in excess of that necessary for the setting of the cement. When the cellular structure is obtained in some other manner it may be found advantageous to vary the proportions slightly so that any other method of producing cellular structure will work advantageously.

It is difficult to determine the exact reason why the finely pulverized silica sand produces a stronger and better cellular concrete. It is possible that the use of this pulverized silica sand is advantageous because the pulverized sand has substantially the same particle size as the Portland cement which is used in the mixture, also the apparent specific gravities of the pulverized sand and Portland cement are substantially the same. Thus during the mixing of the concrete the cement and pulverized sand mingle intimately with each other and as a consequence coat the larger aggregates in substantially the same manner.

The forming of the cellular structure in substantially all cellular concretes causes the mixture of sand and cement to be spread out over a very much greater surface area than when a dense concrete mixture is made. In the dense concrete mixtures the sand and cement merely fill the voids between the larger aggregates of the mass. Cellular concrete, on the other hand, contains voids, the walls of which are customarily very thin walled. These thin partition walls of the cellular structure are customarily thinner than the diameter of the sand used in the heretofore customary concrete mixtures, thus the only material in the former concrete mixtures which could remain in position in these extremely thin walls is the very finely ground Portland cement. Unground sand which has a coarser grained structure has nothing to support it when left in one of these thin walled sections, as a consequence the sand settles out of the thin walled portions and forms into agglomerates which causes the heretofore customary cellular concrete to have an uneven texture.

In accordance with the present invention the sand and cement form an intimate mixture. The components of this mixture being of substantially the same apparent specific gravity do not separate from each other in the thin walled sections of the cellular concrete. Thus the thin walled portions are composed of an advantageous mixture of sand and cement. This, in all probability, accounts for the increased strength of the cellular concrete made in accordance with the present invention.

The addition of a considerable proportion of very finely ground silica tends to make the mixture of sand, cement and water more plastic than if the mixture were made of sand of the customary particle size. This plasticity permits a more uniform distribution or dissemination of the gas forming the cellular structure throughout the mix, as a consequence the gas bubbles produced are of a more uniform size and more evenly distributed through the mixture.

There is also an increase in the number of bubbles within the mixture due to the increased plasticity and generally a decrease in the size of the bubbles. This decrease in the size of the bubbles produces less tension on the thin walled sections and as a consequence there is less tendency for the bubbles to rupture and less shrinkage when the cement sets for fewer of the bubbles collapse. Thus the cracking of the finished material is materially reduced, for not only are the walls of the bubbles of less expanse but they are also more strongly formed because they have the pulverized sand in addition to the finely ground cement to form the cellular walls. Since in the setting of the cellular concrete, made in accordance with the present invention, there is less tendency for the individual bubbles to collapse, as a consequence there is less tendency for the setting concrete to contract and thus form cracks.

The concrete made in accordance with the present invention has increased water-proof qualities over cellular concrete made by the heretofore customary methods. The waterproofness of finished concrete is also improved due probably to the fact that the pulverized sand and the cement form a more intimate and denser mixture than when larger aggregates of sand are used. This denser concrete in the thin cellular walls has less tendency to absorb water due to capillary attraction than does a concrete which has a more open structure. Thus the water-proofness of the finished concrete of the invention is improved from almost every angle.

I claim:

1. The method of making cellular concrete which comprises pulverizing a substantial portion of the sand used in the concrete mixture so that substantially all the pulverized portion passes through a 200 mesh screen, and causing the resultant mix to become porous.

2. The method of making cellular concrete which comprises pulverizing a substantial portion of the sand used in the concrete mixture so that it is substantially the same fineness as the cement, and causing the resultant mix to become porous.

3. The method of making cellular concrete which comprises mixing one part Portland cement, one part sand pulverized to pass through a 200 mesh screen and two parts commercial mortar sand, and causing gas bubbles to be disseminated throughout the mass.

4. Cellular concrete having numerous ports or cells therein separated by relatively thin walls and composed of cement, a substantially equal amount of pulverized sand of cement fineness and a coarser aggregate in larger quantity.

5. Cellular concrete having numerous ports or cells therein separated by relatively thin walls and composed of cement, a substantially equal amount of pulverized sand of cement fineness and a larger amount of commercial mortar sand.

In testimony whereof I affix my signature.

ROLF KARL OSKAR SAHLBERG.